(12) United States Patent
Chu et al.

(10) Patent No.: US 6,587,336 B2
(45) Date of Patent: Jul. 1, 2003

(54) COOLING SYSTEM FOR PORTABLE ELECTRONIC AND COMPUTER DEVICES

(75) Inventors: Richard C. Chu, Poughkeepsie, NY (US); Michael J. Ellsworth, Jr., Lagrangeville, NY (US); Robert E. Simons, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 09/893,135

(22) Filed: Jun. 27, 2001

(65) Prior Publication Data

US 2003/0011983 A1 Jan. 16, 2003

(51) Int. Cl.⁷ .................................................. G06F 1/20
(52) U.S. Cl. ..................... 361/687; 361/688; 361/689
(58) Field of Search ............................... 361/679, 683, 361/686–697, 701–704, 707, 709, 714, 724

(56) References Cited

U.S. PATENT DOCUMENTS

| 5,757,615 A | 5/1998 | Donahoe et al. ............ 361/687 |
| 5,896,922 A | 4/1999 | Chrysler et al. ............ 165/165 |
| 5,934,364 A | 8/1999 | Chrysler et al. ............ 165/170 |
| 5,954,127 A | 9/1999 | Chrysler et al. ............ 165/170 |
| 5,966,286 A | 10/1999 | O'Connor et al. ............ 361/699 |
| 5,970,731 A | 10/1999 | Hare et al. .................. 62/196.4 |
| 6,031,716 A | 2/2000 | Cipolla et al. ............... 361/687 |
| 6,034,872 A | 3/2000 | Chrysler et al. ............. 361/699 |
| 6,035,655 A | 3/2000 | Hare et al. .................. 62/259.2 |
| 6,115,251 A | 9/2000 | Patel et al. .................. 361/699 |
| 6,122,166 A | 9/2000 | Mochizuki et al. .......... 361/687 |
| 6,213,194 B1 | 4/2001 | Chrysler et al. ............ 165/80.3 |

*Primary Examiner*—Darren Schuberg
*Assistant Examiner*—Yean Hsi Chang
(74) *Attorney, Agent, or Firm*—Andrew J. Wojnicki, Jr., Esq.; Kevin P. Radigan, Esq.; Heslin Rothenberg Farley & Mesiti P.C.

(57) ABSTRACT

A cooling system and method of fabrication are provided for cooling one or more heat-generating electronic elements within a portable computer. The cooling system includes a cold plate assembly thermally coupled to a heat-generating electronic element, and a heat exchange structure disposed within the cover of the portable computer. The heat exchange structure includes a hollow channel and an expansion chamber in fluid communication with the channel. A conduit carries coolant between the cold plate assembly and the hollow channel in the heat exchange structure, and a circulation pump circulates coolant through the conduit between the cold plate assembly and the heat exchange structure in a manner to remove heat from the heat-generating electronic component. The expansion chamber integrated within the heat exchange structure provides a reservoir for the circulation pump from which to draw coolant for circulation through the cold plate assembly.

20 Claims, 4 Drawing Sheets

COOLING SYSTEM FOR PORTABLE ELECTRONIC AND COMPUTER DEVICES

TECHNICAL FIELD

The present invention relates to a cooling system and method for cooling high heat dissipating components within electronic and computer system enclosures. More particularly, this invention relates to a cooling system for removing heat from high dissipating components located within portable electronic and computer devices having a main body portion and a cover connected in an openable manner to the main body portion.

BACKGROUND OF THE INVENTION

High heat dissipating components located within small confines of certain consumer electronic devices may create hot spots at certain locations along the external casing of the device. These hot spots may be uncomfortable to the touch, and in some cases may cause injury. Therefore, it is desirable to dissipate heat away from the high heat generating components located within the enclosure of small form factor devices in such a way as to keep the internal components within their specified operating temperature range and to preclude the creation of hot spots along the exterior of the enclosure.

A number of prior techniques have been used to remove heat from heat generating components located within the confines of a computer system enclosure. For example, cooling integrated circuit devices within notebook computers has evolved from the simple attachment of a finned heat sink to the top surface of the device, to the development of finned heat sinks having integral fans. More recent developments have included the use of large, flat heat spreading plates. In such applications, the integrated circuit (generally the CPU) is directly or indirectly attached to a metal plate having a large thermal mass and a large heat transfer surface area. In some instances, the integrated circuit is thermally coupled to the heat spreading plate by a heat pipe. More recently, forced cooling air has been used to cool one side of a heat spreading plate having an integrated circuit attached to the other side. Although these heat transfer methods have proved sufficient in the past, they do not provide the heat removal capacity and/or efficiency needed to cool current and future high-performance microprocessors in portable general-purpose computers and other thin profile electronic devices.

What is needed then is an apparatus and method which solves the aforementioned problems associated with cooling internal electronic circuits located within portable consumer electronic and computer devices. Particularly, what is needed is a highly efficient cooling system that is conformable to the size and power consumption restrictions imposed by small form factor and thin profile electronic devices, such as, for example, notebook computers.

SUMMARY OF THE INVENTION

Briefly described, provided herein in one aspect is a cooling system for a portable computer which includes a computer body having a heat generating electronic element therein, and a display section having a screen connected in an openable manner to the computer body. The cooling system includes a cold plate assembly and a heat exchange structure. The cold plate assembly has a surface thermally coupled to the heat generating electronic element, and the heat exchange structure is disposed within the openable display section of the portable computer. The heat exchange structure includes a hollow channel formed therein. A conduit is provided for carrying coolant between the cold plate assembly and the hollow channel of the heat exchange structure; and a circulation pump is also provided for circulating coolant therethrough. Specifically, the circulation pump circulates coolant between the cold plate assembly and the heat exchange structure in a manner so as to cause heat from the heat generating electronic element to be transferred to the coolant, and carried by the coolant to the heat exchange structure for dissipation therefrom. Advantageously, an expansion chamber is integrated within the heat exchange structure disposed within the openable display section of the portable computer. The expansion chamber is in fluid communication with the hollow channel formed in the heat exchange structure and provides space for expansion of the coolant, and a fluid reservoir for the circulation pump from which to draw coolant for circulation through the cold plate assembly.

In another aspect, an electronic apparatus is provided which includes a base housing having a heat-generating component disposed therein, and a lid housing supported on the base housing for movement relative thereto between open and closed positions. A cooling system is also provided for dissipating operating heat generated by the heat-generating component. The cooling system includes a cold plate assembly having a surface thermally coupled to the heat-generating component, and a heat exchange structure disposed within the lid housing. The heat exchange structure includes a hollow channel formed therein. A flexible conduit carries coolant between the cold plate assembly and the hollow channel within the heat exchange structure. A circulation pump is provided for circulating coolant through the conduit between the cold plate assembly and heat exchange structure in a manner causing heat from the heat-generating component to be transferred to the coolant, and carried by the coolant to the heat exchange structure for dissipation therefrom. An expansion chamber is integrated within the heat exchange structure disposed within the lid housing of the electronic apparatus. The expansion chamber, which is in fluid communication with the hollow channel formed in the heat exchange structure, provides space for expansion of the coolant, and provides a reservoir for the circulation pump from which to draw coolant for circulation through the cold plate assembly.

In a further aspect, a method of fabricating a cooling system is provided for a portable computer which includes a computer body having a heat-generating electronic element, and a display section with a screen connected in an openable manner to the computer body. The method includes: thermally coupling a cold plate assembly to the heat-generating electronic element; disposing a heat exchange structure within the openable display section of the portable computer, the heat exchange structure including a hollow channel formed therein; providing a conduit for carrying coolant between the cold plate assembly and the hollow channel within the heat exchange structure; disposing a circulation pump in the computer body for circulating coolant through the conduit between the cold plate assembly and the heat exchange structure in a manner causing heat from the heat-generating electronic element to be transferred to the coolant, and carried by the coolant to the heat exchange structure for dissipation therefrom; and providing an expansion chamber integrated within the heat exchange structure disposed within the openable display section of the portable computer, the expansion chamber being in fluid communication with the hollow channel formed in the heat exchange structure and providing space for expansion of the coolant, as well as providing a reservoir for the circulation pump from which to draw coolant for circulation through the cold plate assembly.

Advantageously, by integrating an expansion chamber within a heat exchange structure disposed in the cover of a portable computer as proposed herein, the limited available space in the base housing of the portable computer is not impacted. Further, by disposing the expansion chamber within the heat exchange structure within the cover, the present invention provides a net positive suction head to a circulation pump disposed within the base housing of the portable computer, thereby preventing the circulation pump from cavitating (resulting in no fluid pumping/movement). With the circulation pump in the base housing and the expansion chamber in the cover, the net positive suction head at the circulation pump inlet is assured. In addition, the expansion chamber provides an ability to handle expansion and contraction of the coolant circulating through the closed loop cooling system in accordance with the principles of the present invention.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, a cooling system and method for removing heat from a heat generating component located within a thin-profile consumer electronic or computer system enclosure are described herein. In the following description, specific details are set forth such as material types, processing steps, etc., in order to provide a thorough understanding of the present invention. However, it will be obvious to one of skill in the art that the invention may be practiced without these specific details. In other instances, well known elements and processing techniques have not been shown in particular detail in order to avoid unnecessarily obscuring the present invention. In order to illustrate the need for cooling systems that are capable of being integrated within an enclosure having limited available space, this discussion is mainly limited to those needs associated with removing heat from integrated circuits housed within portable computers, such as notebook and laptop computers. It will be recognized, however, that such focus is for descriptive purposes only and that the cooling system and method of the present invention are applicable to other thin profile electronic devices.

Improving computer performance invariably translates into increasing power dissipation. Nowhere does this pose a greater challenge than in a portable computer such as a laptop computer. Present day laptops have their heat removed via natural convection and radiation from the outer casing. This is unlikely to change unless forced convection (i.e., fans blowing over the outer surface) is utilized. The external thermal resistance, which is based on the difference between the casing and the ambient temperature, is therefore constant. Thus improvement in thermal performance must come from reducing the internal thermal resistance, which is based on the temperature difference between the heat generating component (e.g., a processor) and the external case.

Figure 1:
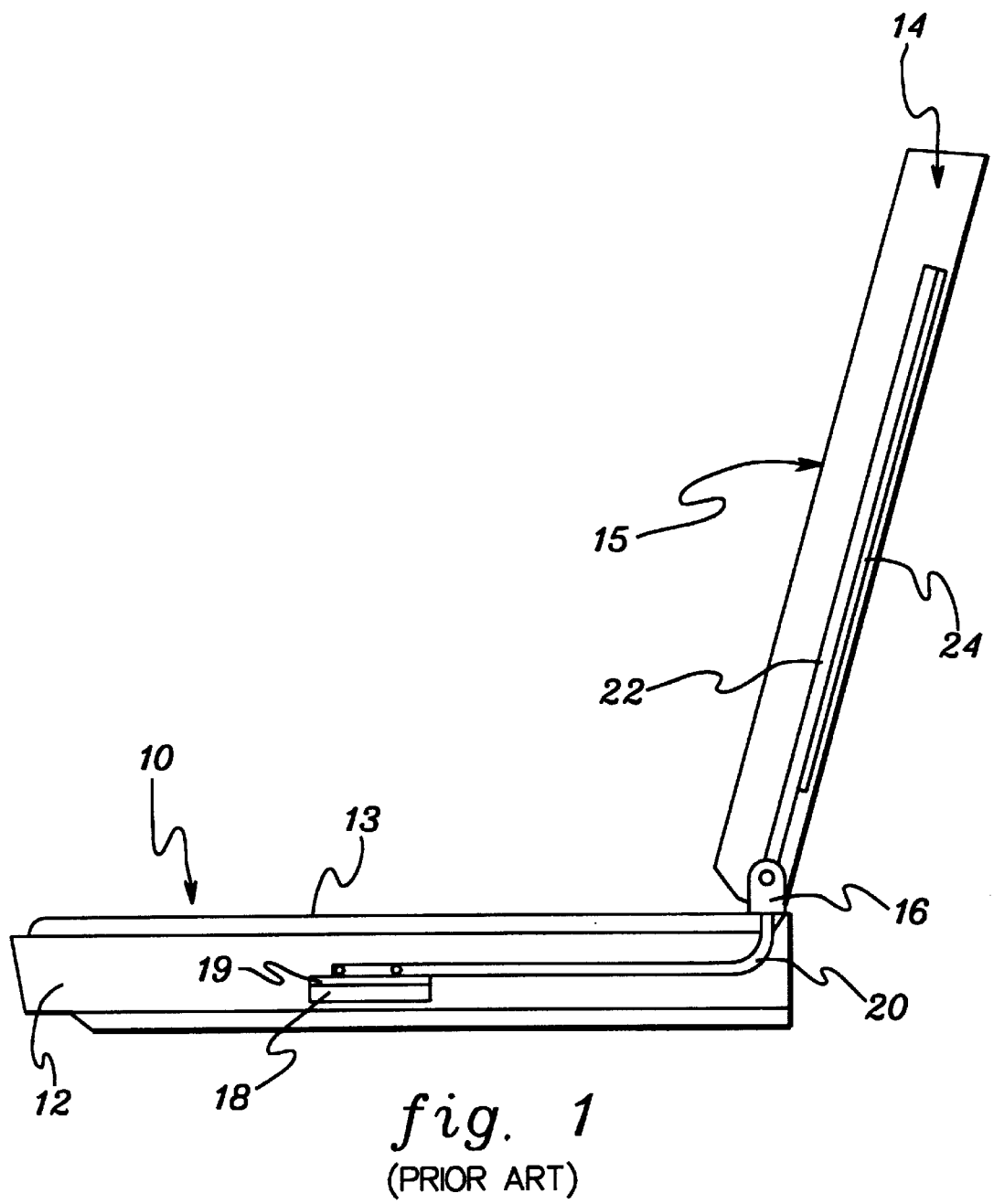
FIG. 1 is a side elevational illustration of a portable computer having a conventional cooling system employing multiple heat pipes.

Heat pipes have been used to lower internal thermal resistance. For example, FIG. 1 depicts the usage of multiple heat pipes 20 & 22 within a laptop computer, generally denoted 10. Computer 10 includes a computer body 12 and a cover 14 which is connected in an openable manner to the computer body via at least one hinge 16. Computer body 12 includes a keyboard or keypad 13, and cover 14 includes a display screen 15 viewable by a user of the portable computer 10.

Within computer body 12, one or more heat generating components 18 are disposed from which heat is to be extracted. Heat pipe 20 has one end thermally connected to heat generating component 18 via, for example, a thermal grease 19. From heat generating component 18, heat is transferred across heat pipe 20 to an end thereof proximate to hinge 16. Hinge 16 comprises a thermally conductive hinge which transfers heat from heat pipe 20 to heat pipe 22 disposed within cover 14. In this embodiment, heat pipe 22 is mounted to a thermal dissipation plate 24 located at the backside of cover 14.

Operationally, the objective is to transport heat dissipated by the processor to the back of the cover with as low a thermal resistance as possible. Ideally, a heat pipe would run directly between the processor and the cover. If this were done, however, the heat pipe would have to bend with the opening and closing of the cover which rotates on the hinge by an angle of more than 150 degrees. While a heat pipe can be formed with ends of almost any angle, they cannot be bent repeatedly without mechanically fracturing, which would render the heat pipe nonfunctional. Therefore, in practice, two heat pipes are utilized as shown in FIG. 1, i.e., one in the laptop base where the processor, hard drive, battery, etc. are located, and the other in the cover where the display is located. The two heat pipes are coupled together by conduction through the hinge. Unfortunately, this arrangement inherently has the thermal penalty of conduction through the hinge which includes several interface resistances, and is thus not as effective as transport within a single heat pipe.

In accordance with the principles of the present invention, heat is more effectively transferred to an openable cover of a portable computer by incorporating an active liquid cooling loop into the electronics apparatus. The cooling system presented herein is more effective than a heat pipe system in part because of the elimination of the thermal penalty incurred by conduction through the hinge.

Closed liquid loops typically require an expansion space or tank to account for the volumetric expansion of the liquid under varying environmental temperatures. Disclosed herein is the concept of integrating a heat exchanger between the liquid cooling system and the environment, and an expansion space within the heat exchanger itself to minimize impact of the cooling system on the geometry of the portable computer.

Figure 2:
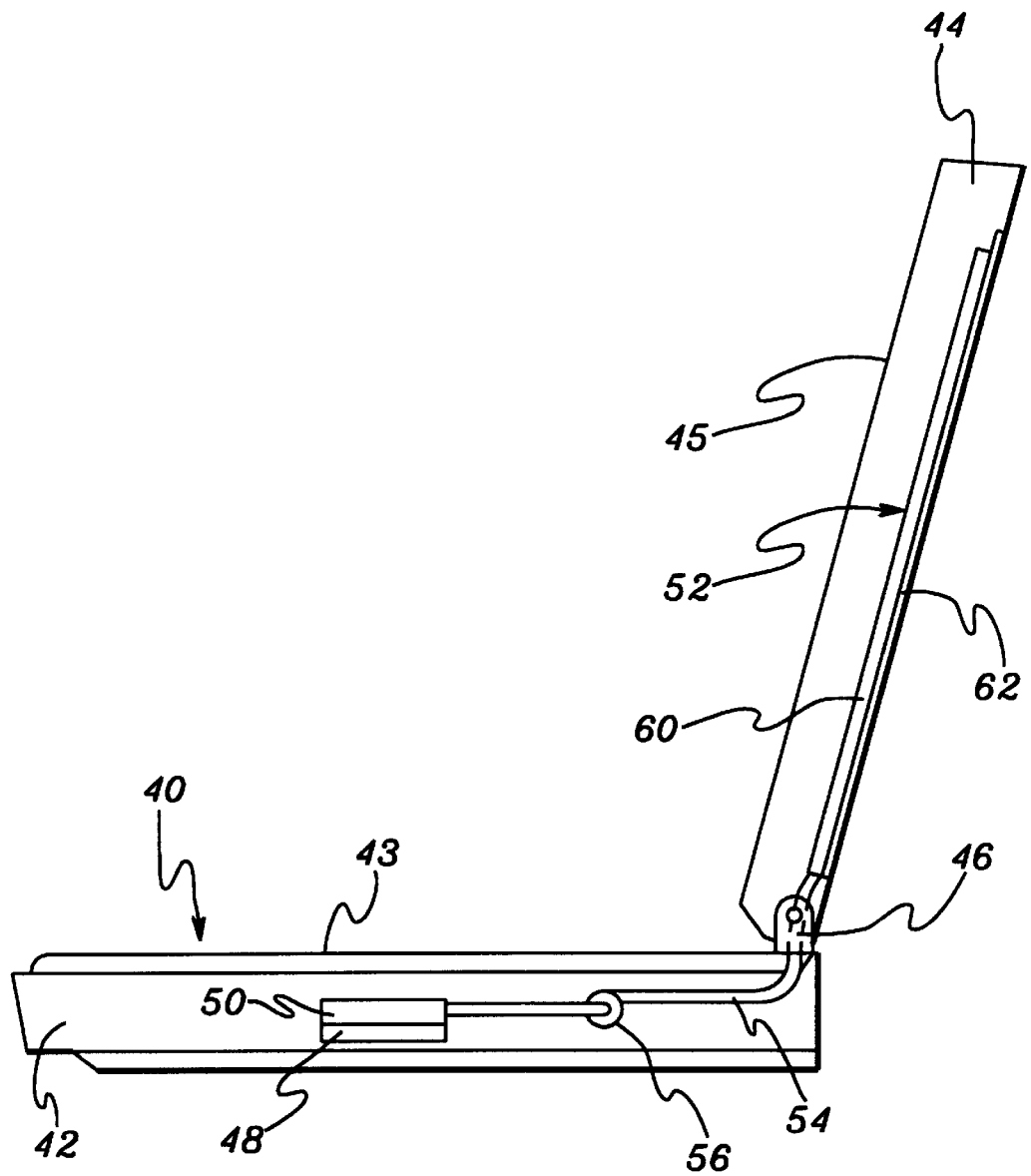
FIG. 2 is a side elevational illustration of one embodiment of a portable computer employing a liquid cooling system in accordance with the principles of the present invention.

FIG. 2 depicts one embodiment of a portable computer 40 having a cooling system in accordance with the principles of the present invention. Portable computer 40 includes a computer body 42 having a keyboard and/or keypad 43 on an upper surface thereof, and a cover 44 which is connected in an openable manner to the computer body. In this embodiment, one or more hinges 46 are provided so that cover 44 pivots between an open and closed position relative to computer body 42. Cover 44 includes a user viewable display screen 45.

One or more heat generating electronic elements 48 are disposed within computer body 42 from which heat is to be removed. In this embodiment, heat produced by element 48 is transferred to an active liquid cooling loop via a cold plate assembly 50. Cold plate assemblies for cooling a heat generating component are described in various issued United States Letters Patents, including U.S. Pat. Nos. 6,213,194; 6,035,655; 6,034,872; 5,970,731; 5,954,127; 5,934,364; 5,896,922 as well as certain commonly assigned, co-pending United States Patent Applications, such as "Electronic Module With Integrated Programmable Thermo-Electric Cooling Assembly and Method of Fabrication", by Chu et al., U.S. Ser. No. 09/726,909, filed Nov. 30, 2000, and "Electronic Module With Integrated Thermo-Electric Cooling Assembly", by Chu et al., U.S. Ser. No. 09/726,900, filed Nov. 30, 2000. Each of these issued United States Letters Patents and co-pending, commonly assigned U.S. Patent applications is hereby incorporated herein by reference in its entirety.

Liquid coolant is pumped via a miniature circulation pump 56 (such as a centrifugal pump) through flexible plastic tubing 54 into a heat exchange structure 52 disposed within cover 44 of portable computer 40. Tubing 54 is preferably continuous between the computer body and the cover to minimize heat transfer interfaces. Within the heat transfer structure the heated liquid undergoes cooling as heat is transferred to the ambient environment, which can be facilitated by the provision of a thermally conductive backing plate 62 coupled to the conductive channels of the heat exchange structure.

Figure 3A:
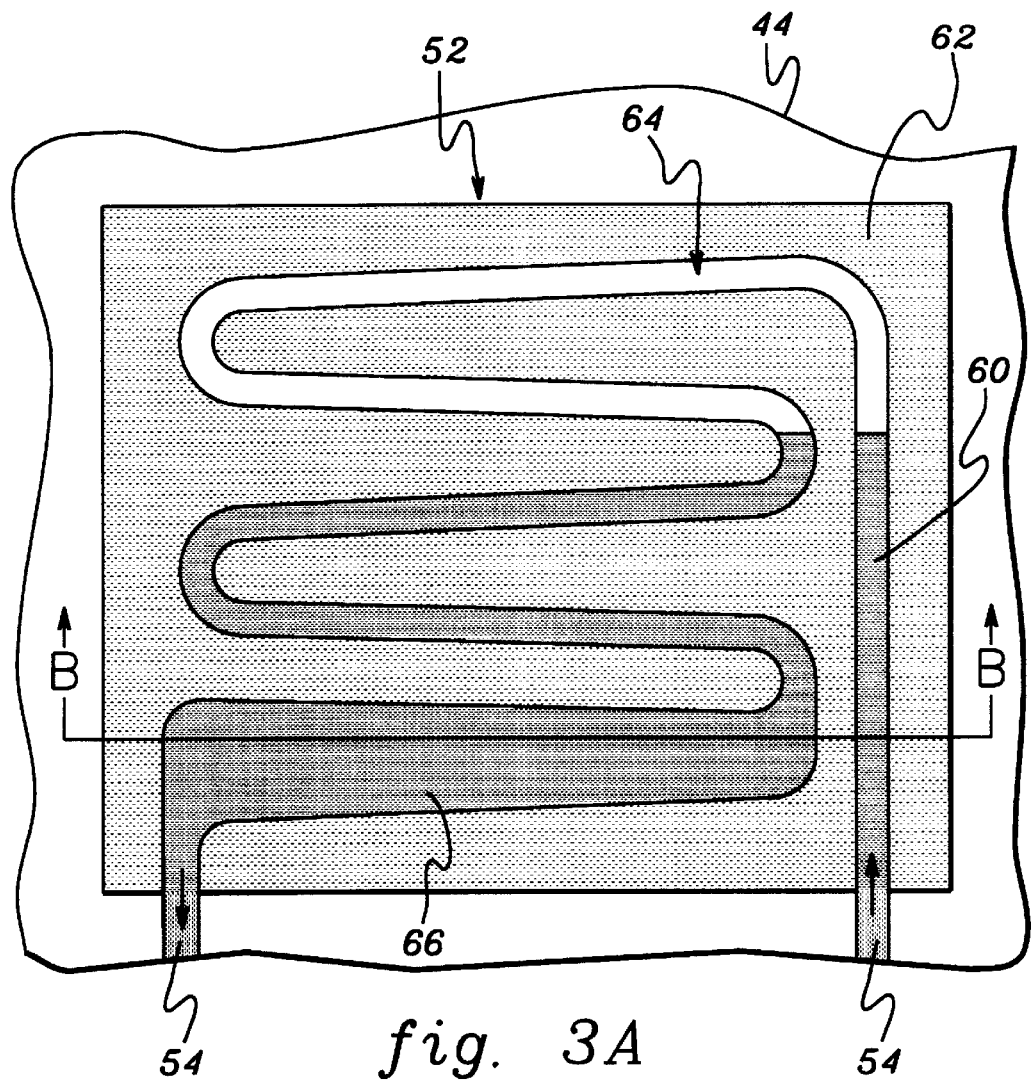
FIG. 3A is a plan view depiction of one embodiment of the heat exchange structure 52 shown in FIG. 2 and having an integrated expansion chamber formed therein in accordance with the principles of the present invention.
Figure 3B:
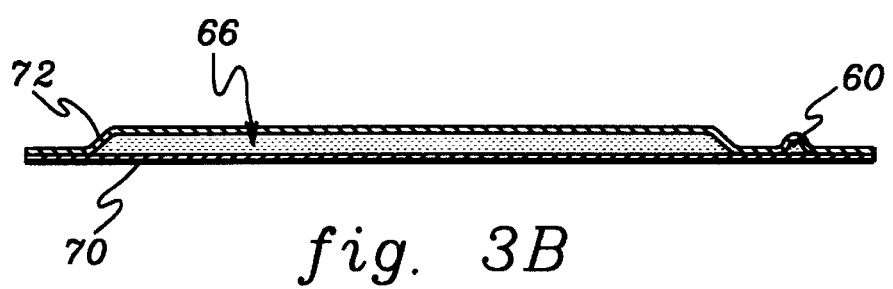
FIG. 3B is a cross-sectional view of the heat exchange structure of FIG. 3A taken along line BB.

One embodiment of the heat exchange structure is depicted in greater detail in FIGS. 3A & 3B. As shown, heat exchange structure 52 includes a flat backing plate 62 comprising a first sheet of aluminum 70 (see FIG. 3B), and a sinusoidal-shaped hollow channel 60 with integrated expansion chamber 66 formed by stamping a second sheet of aluminum 72 (FIG. 3B) to provide the desired coolant spaces. Aluminum, which is a good thermal conductor, is provided by way of example as one possible thermally conductive material from which to fabricate the heat sink structure. Aluminum is also advantageous for being lightweight. Heat sink structure 52 can be formed by laminating the two plates together as shown using conventional lamination techniques to form both the hollow chamber 60 and expansion chamber 66. Note that the hollow channel is formed so that once fluid is pumped to an upper portion thereof it flows through a sinusoidal shaped section by gravity into the expansion chamber 66. This can be achieved by sloping the hollow channel from an uppermost point thereof in the computer cover (i.e., when open) downward towards the expansion channel 66 which is disposed in a lower portion of the computer cover. FIG. 3A shows coolant level within hollow channel 60 and expansion chamber 66 with the computer cover open but the computer non-operational. In one embodiment, the circulation pump can be tied to the state of the laptop computer so that once turned on, the processor automatically activates the circulation pump to pump coolant through the cooling system.

Figure 4:
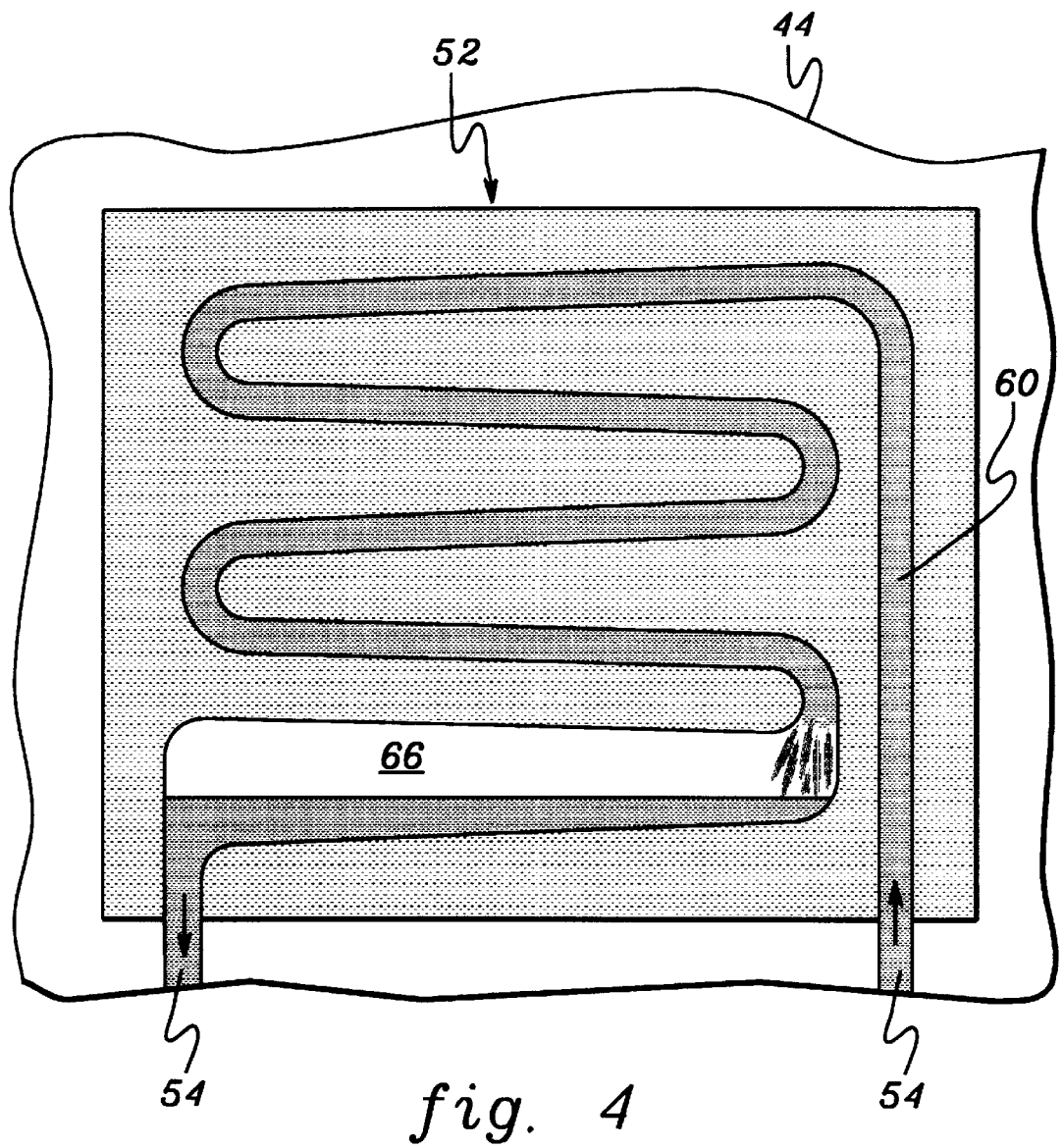
FIG. 4 is a plan view of the heat exchange structure of FIGS. 3A & 3B showing coolant level within the expansion chamber when the portable computer is in use and the cooling system is operational.

FIG. 4 depicts coolant level within the heat exchange structure 52 when circulation pump 56 (FIG. 2) is active. As shown, the equilibrium position of coolant within expansion chamber 66 is reached and the chamber is sized to ensure that there will always be a positive head of liquid over the circulation pump. Additionally, expansion chamber 66 allows for expansion of the coolant as the coolant expands with the addition of heat into the system. By design, coolant will reenter the expansion space prior to the expansion space completely emptying out. This results in a liquid (suction) head on the circulation pump at all times.

Various types of liquid coolant can be employed within the cooling system. For example, the coolant could comprise water, a water and alcohol mixture, or a water and glycol mixture. Those skilled in the art will realize that other coolant mixtures could also be employed.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A cooling system for a portable computer which includes a computer body having a heat generating electronic element therein, and a display section having a screen connected in an openable manner to the computer body, the cooling system comprising:

a cold plate assembly having a surface thermally coupled to the heat generating electronic element;

a heat exchange structure disposed within the openable display section of the portable computer, said heat exchange structure including a channel structure formed therein, the channel structure being hollow and having a first fluid flow cross-sectional area;

a conduit for carrying coolant between the cold plate assembly and the hollow channel within the heat exchange structure;

a circulation pump for circulating coolant through the conduit between the cold plate assembly and heat exchange structure in a manner causing heat from the heat generating electronic element to be transferred to the coolant, and carried by the coolant to said heat exchange structure for dissipation therefrom; and an expansion chamber integrated within the heat exchange structure disposed within the openable display section of the portable computer, the expansion chamber being in fluid communication with the channel structure formed in the heat exchange structure and providing space for expansion of the coolant, as well as providing a reservoir for the circulation pump from which to draw coolant for circulation through the cold plate assembly, the expansion chamber having a second fluid flow cross-sectional area, wherein the second fluid flow cross-sectional area of the expansion chamber is greater than the first fluid flow cross-sectional area of the channel structure.

2. The cooling system of claim 1, wherein the display section is disposed within a cover of the portable computer, the cover being hinged to the computer body by at least one hinge so as to be openable, and wherein the conduit comprises a flexible conduit passing through the at least one hinge and connecting the cold plate assembly in the computer body to the heat exchange structure in the cover, wherein the expansion chamber integrated within the heat exchange structure is also disposed within the cover.

3. The cooling system of claim 1, further comprising means for automatically activating the circulation pump with activation of the portable computer.

4. The cooling system of claim 1, wherein the circulation pump is disposed within the computer body and the expansion chamber integrated within the heat exchange structure is disposed within a cover of the portable computer, said display section being disposed within the cover.

5. The cooling system of claim 1, wherein the display section resides within a cover of the portable computer, the cover being openable relative to the computer body, and wherein the channel structure formed in the heat exchange structure comprises a sinusoidal shaped channel structure disposed within the cover, wherein coolant pumped to a top of the sinusoidal shaped channel structure in the cover flows by gravity into the expansion chamber integrated within the heat exchange structure.

6. The cooling system of claim 5, wherein the circulation pump is disposed within the computer body and the expansion chamber is located within the cover of the portable computer.

7. The cooling system of claim 5, wherein the channel structure formed in the heat exchange structure passes through the expansion chamber integrated within the heat exchange structure.

8. The cooling system of claim 1, wherein the heat exchange structure comprises at least one plate of thermally conductive material.

9. The cooling system of claim 1, wherein the expansion chamber is sized to allow for volumetric expansion and contraction of coolant within the cooling system, and to maintain a positive suction head on the circulation pump.

10. The cooling system of claim 9, wherein the circulation pump is disposed within the computer body.

11. A cooling system for a portable computer which includes a computer body having a heat generating electronic element therein, and a display section having a screen connected in an openable manner to the computer body, the cooling system comprising:
   a cold plate assembly having a surface thermally coupled to the heat generating electronic element;
   a heat exchange structure disposed within the openable display section of the portable computer, said heat exchange structure including a hollow channel formed therein;
   a conduit for carrying coolant between the cold plate assembly and the hollow channel within the heat exchange structure;
   a circulation pump for circulating coolant through the conduit between the cold plate assembly and heat exchange structure in a manner causing heat from the heat generating electronic element to be transferred to the coolant, and carried by the coolant to said heat exchange structure for dissipation therefrom;
   an expansion chamber integrated within the heat exchange structure disposed within the openable display section of the portable computer, the expansion chamber being in fluid communication with the hollow channel formed in the heat exchange structure and providing space for expansion of the coolant, as well as providing a reservoir for the circulation pump from which to draw coolant for circulation through the cold plate assembly; and
   wherein the heat exchange structure comprises at least one plate of thermally conductive material, the at least one plate of thermally conductive material comprises a first plate and a second plate, the first plate being flat and the second plate being stamped to define the hollow channel of the heat exchange structure and the integrated expansion chamber when the first plate and the second plate are secured together.

12. Electronic apparatus comprising:
   a base housing having a heat generating component disposed therein;
   a lid housing supported on the base housing for movement relative thereto between open and closed positions; and
   a cooling system for dissipating operating heat generated by the heat generating component, the cooling system including:
      a cold plate assembly having a surface thermally coupled to the heat generating component;
      a heat exchange structure disposed within the lid housing, the heat exchange structure including a channel structure formed therein, the channel structure being hollow and having a first fluid flow cross-sectional area;
      a conduit for carrying coolant between the cold plate assembly and the hollow channel within the heat exchange structure;
      a circulation pump for circulating coolant through the conduit between the cold plate assembly and the heat exchange structure in a manner causing heat from the heat generating component to be transferred to the coolant, and carried by the coolant to the heat exchange structure for dissipation therefrom; and
      an expansion chamber integrated within the heat exchange structure disposed within the lid housing of the electronic apparatus, the expansion chamber being in fluid communication with the channel structure formed in the heat exchange structure and providing space for expansion of the coolant, as well as providing a reservoir for the circulation pump from which to draw coolant for circulation through the cold plate assembly, the expansion chamber having a second fluid flow cross-sectional area, wherein the second fluid flow cross-sectional area of the expansion chamber is greater than the first fluid flow cross-sectional area of the channel structure.

13. The electronic apparatus of claim 12, wherein said electronic apparatus is a portable computer.

14. The electronic apparatus of claim 13, wherein the portable computer is a notebook computer.

15. The electronic apparatus of claim 12, wherein the circulation pump is disposed in the base housing.

16. The electronic apparatus of claim 12, wherein the coolant is one of water, a mixture of water and glycol, or a mixture of water and alcohol.

17. The electronic apparatus of claim 12, wherein the channel structure formed within the heat exchange structure comprises a sinusoidal shaped channel structure, wherein coolant pumped to a top of the sinusoidal shaped channel structure in the cover flows by gravity into the expansion chamber integrated within the heat exchange structure.

18. The electronic apparatus of claim 17, wherein the hollow channel formed in the heat exchange structure passes through the expansion chamber integrated within the heat exchange structure.

19. A method of fabricating a cooling system for a portable computer which includes a computer body having a heat generating electronic element therein, and a display section having a screen connected in an openable manner to the computer body, the method comprising:

thermally coupling a cold plate assembly to the heat generating electronic element;

disposing a heat exchange structure within the openable display section of the portable computer, the heat exchange structure including a channel structure formed therein, the channel structure being hollow and having a first fluid flow cross-sectional area;

providing a conduit for carrying coolant between the cold plate assembly and the hollow channel within the heat exchange structure;

disposing a circulation pump in the computer body for circulating coolant through the conduit between the cold plate assembly and the heat exchange structure in a manner causing heat from the heat generating electronic element to be transferred to the coolant, and carried by the coolant to the heat exchange structure for dissipation therefrom; and providing an expansion chamber integrated within the heat exchange structure disposed within the openable display section of the portable computer, the expansion chamber being in fluid communication with the channel structure formed in the heat exchange structure and providing space for expansion of the coolant, as well as providing a reservoir for the circulation pump from which to draw coolant for circulation through the cold plate assembly, the expansion chamber having a second fluid flow cross-sectional area, wherein the second fluid flow cross-sectional area of the expansion chamber is greater than the first fluid flow cross-sectional area of the channel structure.

20. The method of claim 19, further comprising forming the channel structure in the heat exchange structure as a sinusoidal shaped channel structure, wherein coolant pumped to a top of the sinusoidal shaped channel structure in the cover flows by gravity into the expansion chamber integrated within the heat exchange structure.

\* \* \* \* \*